US012536861B2

(12) United States Patent
Chan

(10) Patent No.: US 12,536,861 B2
(45) Date of Patent: Jan. 27, 2026

(54) BELT VENDING MACHINE AND BELT MANUFACTURING METHOD

(71) Applicant: Edward Chan, Whittier, CA (US)

(72) Inventor: Edward Chan, Whittier, CA (US)

( * ) Notice: Subject to any disclaimer, the term of this patent is extended or adjusted under 35 U.S.C. 154(b) by 146 days.

(21) Appl. No.: 18/676,968

(22) Filed: May 29, 2024

(65) Prior Publication Data

US 2025/0371926 A1 Dec. 4, 2025

(51) Int. Cl.
*B26F 1/14* (2006.01)
*G07F 11/52* (2006.01)
*A41F 9/00* (2006.01)

(52) U.S. Cl.
CPC ................ *G07F 11/52* (2013.01); *B26F 1/14* (2013.01); *A41F 9/00* (2013.01)

(58) Field of Classification Search
CPC ............... G07F 11/52; B26F 1/14; A41F 9/00
See application file for complete search history.

(56) References Cited

U.S. PATENT DOCUMENTS 4,706,585 A * 11/1987 Schuurmans ............. A41F 9/00 112/152
5,005,688 A * 4/1991 Yukimoto ................. G07F 7/04 453/56
5,092,445 A * 3/1992 Kozima .................... G07F 7/04 235/484
5,230,761 A * 7/1993 Crawford .......... B29C 66/83411 156/73.2
5,529,208 A * 6/1996 Carstens .............. G07C 15/005 221/296
6,067,898 A * 5/2000 Lin ......................... G07F 9/105 221/150 HC
2006/0272285 A1* 12/2006 Lin ......................... G07F 11/26 53/393
2016/0253860 A1* 9/2016 Wilson .................... G07F 11/04 221/258
2017/0206733 A1* 7/2017 Yu ........................... G07F 9/105
2020/0294344 A1* 9/2020 Adams ................ G07F 17/0071
2024/0087396 A1* 3/2024 Braido .................... G07F 11/58

FOREIGN PATENT DOCUMENTS

WO WO-2005109355 A2 * 11/2005 .............. G07F 11/16

* cited by examiner

*Primary Examiner* — Omar Flores Sanchez

(57) ABSTRACT

A belt vending machine and a belt manufacturing method are provided. The belt vending machine comprises a feeding device, a belt manufacturing device, and an embossing wheel pick-and-place device. The embossing wheel pick-and-place device provides various embossing wheels with different embossing patterns for the user to choose from. The feeding device provides multiple reels for holding various styles or colors of belt rolls. This allows the belt vending machine to manufacture unique belts according to the user's preferences.

10 Claims, 7 Drawing Sheets

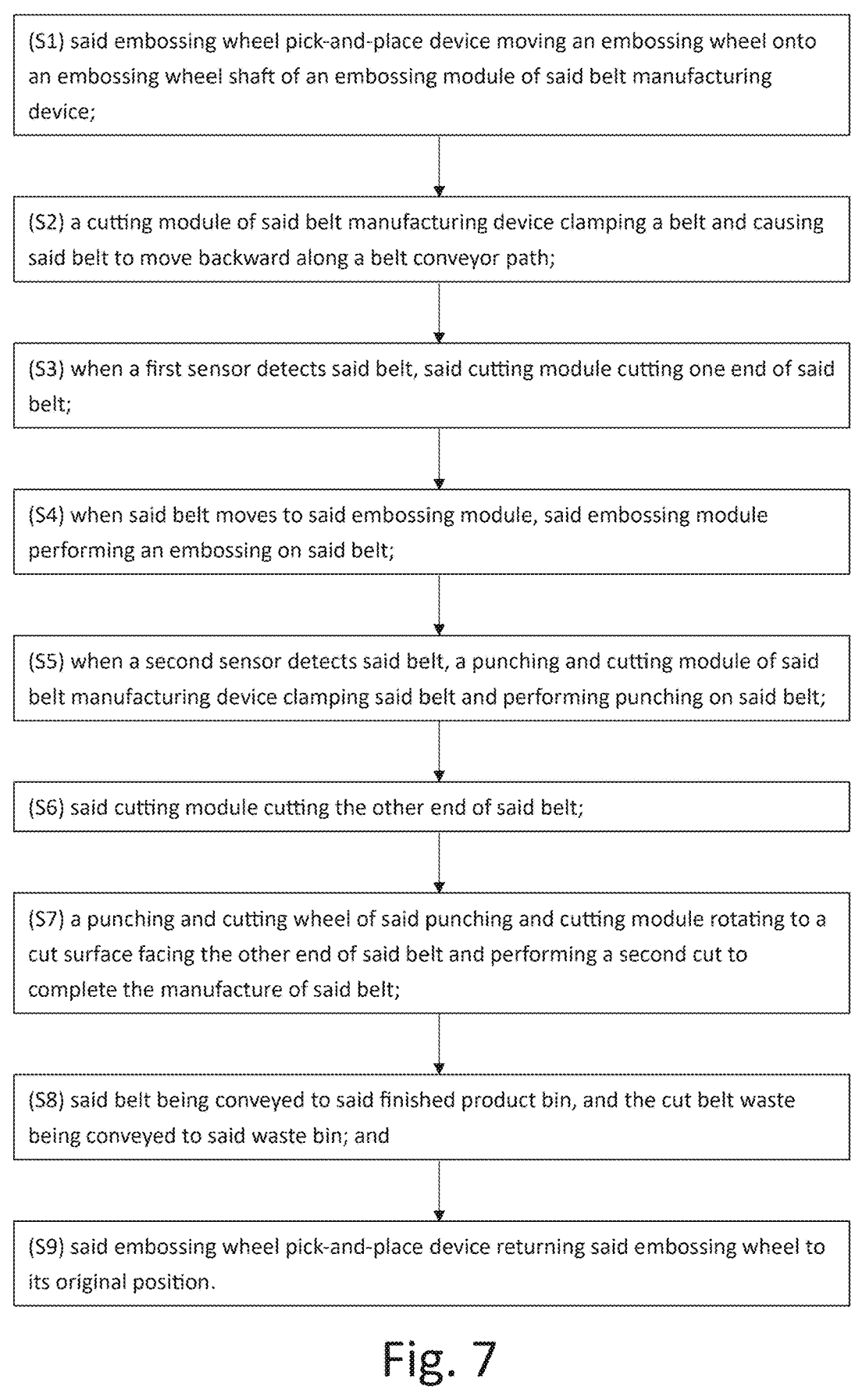

(S1) said embossing wheel pick-and-place device moving an embossing wheel onto an embossing wheel shaft of an embossing module of said belt manufacturing device;

↓

(S2) a cutting module of said belt manufacturing device clamping a belt and causing said belt to move backward along a belt conveyor path;

↓

(S3) when a first sensor detects said belt, said cutting module cutting one end of said belt;

↓

(S4) when said belt moves to said embossing module, said embossing module performing an embossing on said belt;

↓

(S5) when a second sensor detects said belt, a punching and cutting module of said belt manufacturing device clamping said belt and performing punching on said belt;

↓

(S6) said cutting module cutting the other end of said belt;

↓

(S7) a punching and cutting wheel of said punching and cutting module rotating to a cut surface facing the other end of said belt and performing a second cut to complete the manufacture of said belt;

↓

(S8) said belt being conveyed to said finished product bin, and the cut belt waste being conveyed to said waste bin; and

↓

(S9) said embossing wheel pick-and-place device returning said embossing wheel to its original position.

Fig. 7

BELT VENDING MACHINE AND BELT MANUFACTURING METHOD

FIELD OF INVENTION

The present disclosure relates to an automatic belt vending machine and a belt manufacturing method, more particularly to a belt vending machine and a belt manufacturing method capable of instantly producing customized belts with embossed patterns.

BACKGROUND OF THE INVENTION

The current method of selling belts is to put pre-made belts in special glass cabinets or hang them on display racks. All belts need to be pre-made in factories through various types of work, which requires a lot of manpower and increases the storage cost of finished products.

At present, there are no automatic belt printing vending machines in the market in any country, because achieving automatic belt printing requires high-precision component assemblies and highly automated programming to support. Therefore, belt printing is currently only done within factories, and there are no stand-alone automatic belt printing vending machines on the market.

SUMMARY OF THE INVENTION

In view of the foregoing, the purpose of the present disclosure is to provide a belt vending machine and a belt manufacturing method, more particularly referring to an automatic belt vending machine and a belt manufacturing method capable of instantly manufacturing customized belts with embossed patterns, which can save time for manual production and reduce inventory costs.

According to the purpose of the present disclosure, a belt vending machine is provided. The interior of the belt vending machine comprises a feeding device, which includes multiple reels, each reel having a belt roll installed, with each belt roll extending a belt from an outlet; a belt manufacturing device which can move in accordance with the positions of the outlets, having a belt conveyor path, a side plate vertically arranged on the left side of the belt conveyor path, a cutting module, an embossing module, and a punching and cutting module arranged sequentially from front to rear on the side plate, wherein two sensors are installed on the bottom surface of the belt conveyor path, and the positions of the two sensors correspond to the positions of the cutting module and the punching and cutting module, respectively; and an embossing wheel pick-and-place device located below the belt manufacturing device, having a placement rack for holding multiple embossing wheels and a pick-and-place module for moving one of the embossing wheels to the embossing module.

The cutting module comprises, from top to bottom, a cutting motor, a cutting assembly, a front pressure roller, and a front drive roller; wherein the front pressure roller is located above the belt conveyor path, the front drive roller is located below the belt conveyor path, and the cutting motor is used to drive the rotation of the front pressure roller.

The punching and cutting module comprises, from top to bottom, a punching and cutting motor, a punching and cutting wheel, a rear pressure roller, and a rear drive roller; wherein the rear pressure roller is located above the belt conveyor path and the rear drive roller is located below the belt conveyor path, the punching and cutting motor is used to drive the rotation of the rear pressure roller, and the punching and cutting wheel is connected to a switch motor for driving the rotation of the punching and cutting wheel.

The embossing module includes an embossing wheel shaft, a lifting motor, and a lifting roller; wherein the embossing wheel shaft is located above the belt conveyor path, the lifting roller is located below the belt conveyor path, and the lifting motor is connected below the lifting roller.

The belt manufacturing device further comprises a drive motor for driving the rotation of the front drive roller, the embossing wheel shaft, and the rear drive roller.

The punching and cutting wheel has multiple rotating surfaces, with each rotating surface having multiple mounting holes for mounting a punching plate or a cutting plate.

The belt manufacturing device further comprises a mounting base plate vertically arranged on the side plate, with the mounting base plate being mounted on a Y-axis moving module and movable along a track of the Y-axis moving module.

The pick-and-place module includes a pick-and-place assembly, a Z-axis moving module, and an X-axis moving module; wherein the Z-axis moving module is mounted on the X-axis moving module, the X-axis moving module drives the back-and-forth movement of the Z-axis moving module, and the pick-and-place assembly is mounted on the Z-axis moving module which can drive the up-and-down movement of the pick-and-place assembly.

The pick-and-place assembly includes a retrieval head connected to an extending structure which is connected to a retrieval motor, with the retrieval motor controlling the retrieval head to approach or move away from the direction of the placement rack for retrieving one of the embossing wheels and moving it to the embossing module.

A belt manufacturing method for a belt vending machine, wherein the interior of the belt vending machine comprises a feeding device, a belt manufacturing device, an embossing wheel pick-and-place device, a waste bin, and a finished product bin. The belt manufacturing method comprising the steps of:

S1: the embossing wheel pick-and-place device moves an embossing wheel onto an embossing wheel shaft of an embossing module of the belt manufacturing device;

S2: a cutting module of the belt manufacturing device clamps a belt and causes the belt to move backward along a belt conveyor path;

S3: when a first sensor detects the belt, the cutting module cuts one end of the belt;

S4: when the belt moves to the embossing module, the embossing module performs an embossing on the belt;

S5: when a second sensor detects the belt, a punching and cutting module of the belt manufacturing device clamps the belt and performs punching on the belt;

S6: the cutting module cuts the other end of the belt;

S7: a punching and cutting wheel of the punching and cutting module rotates to a cut surface facing the other end of the belt and performs a second cut to complete the belt manufacture;

S8: the belt is conveyed to the finished product bin, and the cut belt waste is conveyed to the waste bin; and S9: the embossing wheel pick-and-place device returns the embossing wheel to its original position.

BRIEF DESCRIPTION OF THE DRAWINGS

FIG. 7 is a flow chart of the belt manufacturing method of the present disclosure.

DETAILED DESCRIPTION OF THE PREFERRED EMBODIMENTS

Figure 1:
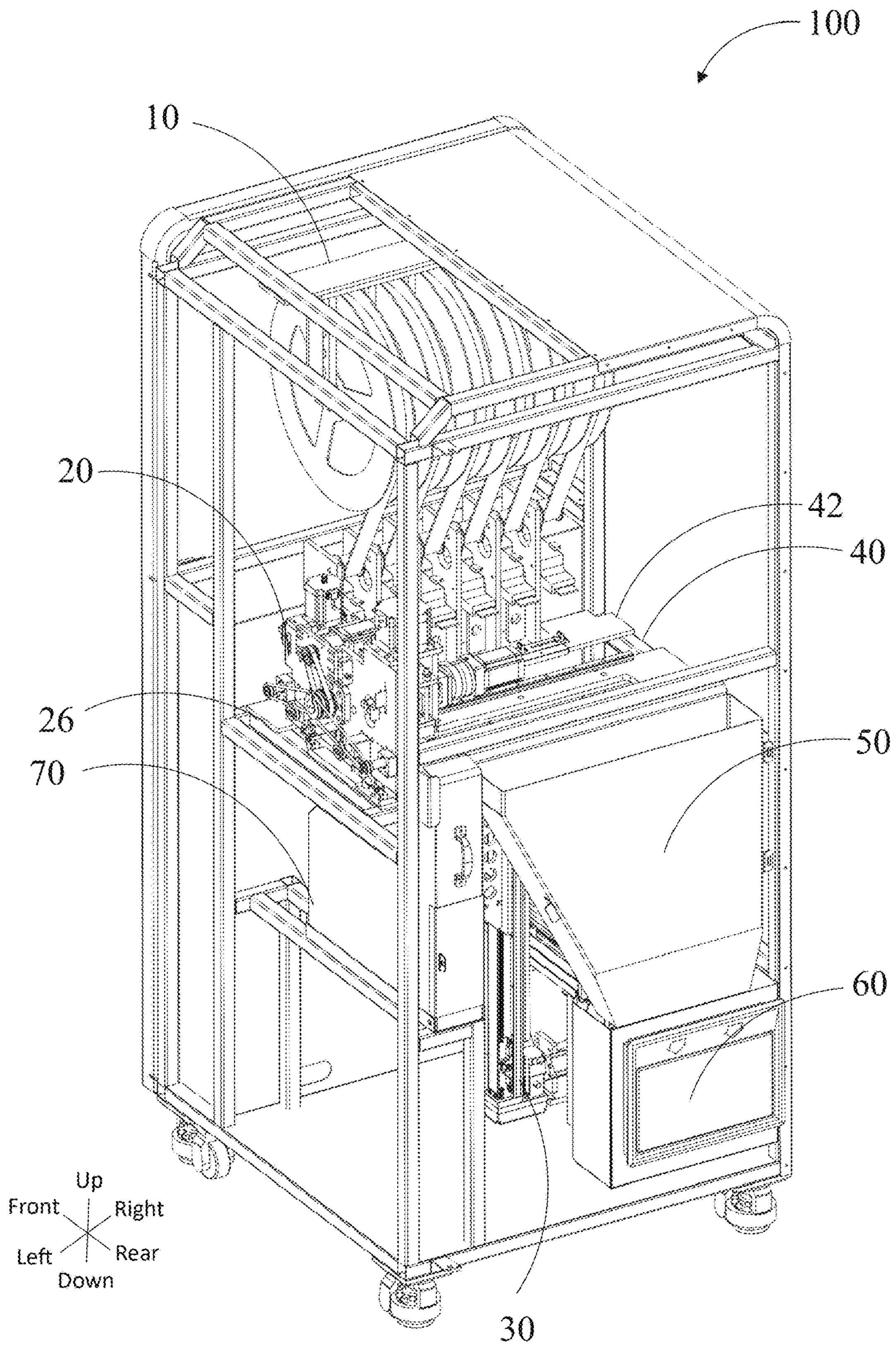
FIG. 1 is a schematic diagram of the belt vending machine of the present disclosure.

The descriptions of directions such as "front," "rear," "up," "down," "left," and "right" in this text are only for ease of understanding, and the present disclosure is not limited to these directions, but can be adjusted according to the actual situation. In the present disclosure, the Z-axis direction is the up-down direction, the X-axis direction is the front-rear direction, and the Y-axis direction is the left-right direction.

In order to clearly describe the specific embodiments, structures, and effects achieved by the present disclosure, the following embodiments are provided with accompanying drawings:

Reference is made to FIGS. 1 to 6, which illustrate a belt vending machine, the interior of which comprises a feeding device 10, a belt manufacturing device 20, an embossing wheel pick-and-place device 30, a waste bin 70, and a finished product bin 50.

Figure 2:
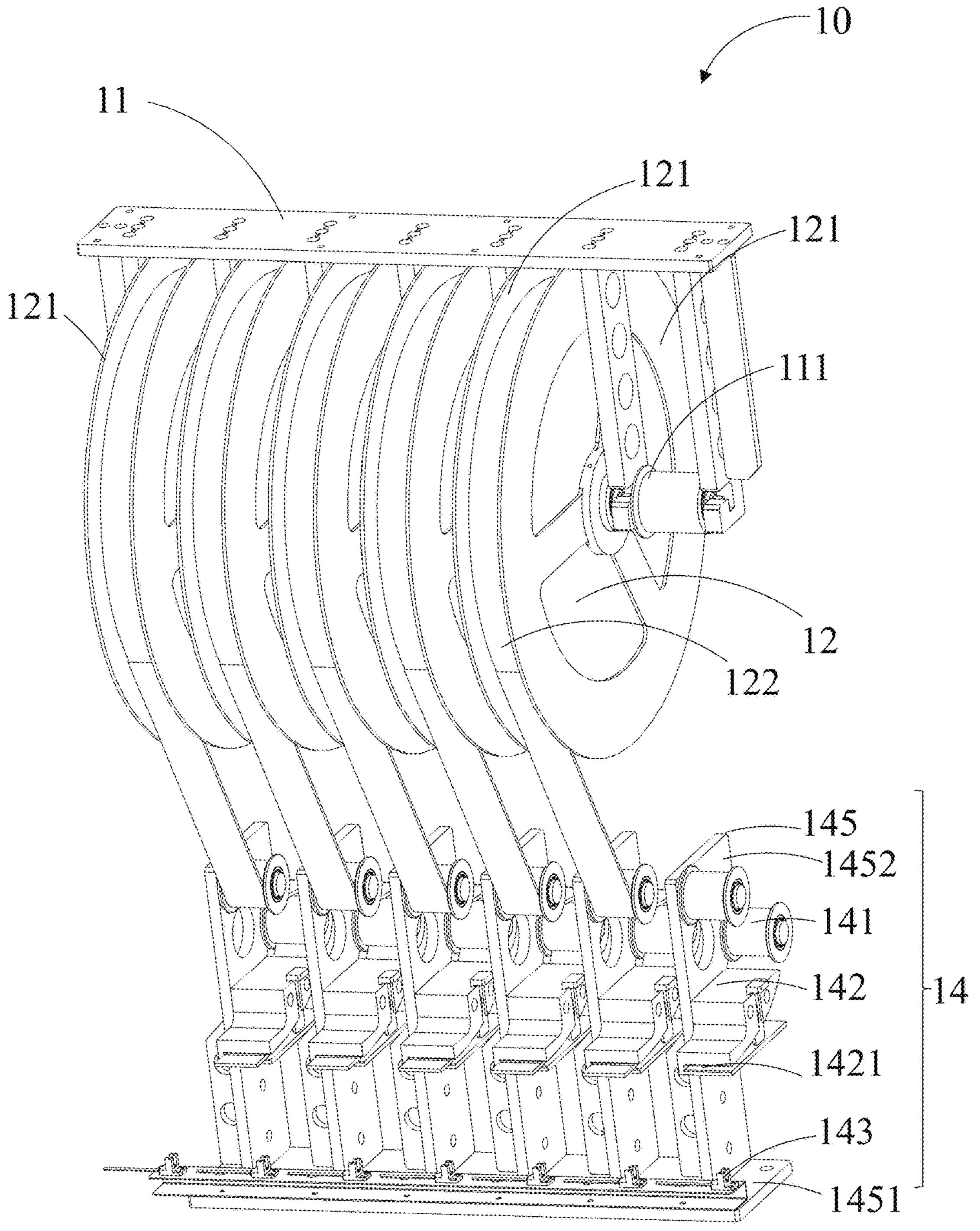
FIG. 2 is a schematic diagram of the feeding device of the belt vending machine of the present disclosure.

Reference is made to FIG. 2. The feeding device 10 has a fixed frame 11, with multiple reels 12 disposed on the fixed frame 11. Each reel 12 has a spindle 111, with a belt roll 122 mounted on the spindle 111 and capable of rotating to extend a belt T. Each reel 12 has reel plates 121 on its left and right sides for clamping the belt roll 122 to prevent the belt T from deviating from the position of the reel 12 when being pulled out, wherein the reels 12 can hold belt rolls 122 of different models, materials, widths, thicknesses, or colors. In the embodiment of the present disclosure, each reel 12 can be individually removed and replaced without affecting the others.

The feeding device 10 further comprises an outlet guide assembly 14 disposed below the reels 12. The outlet guide assembly 14 comprises a guide support frame 145 having a base plate 1451 and multiple upright plates 1452 disposed on the base plate 1451. The number and positions of the upright plates 1452 correspond to the number and positions of the reels 12.

Furthermore, at least one guide roller shaft 141 and an outlet guide frame 142 are disposed on one side of each upright plate 1452. When the belt roll 122 extends the belt T, the belt T will be guided around the guide roller shaft 141 and into the outlet guide frame 142, and the belt T will be extended out from an outlet 1421 of the outlet guide frame 142. Wherein, the base plate 1451 of the guide support frame 145 also has multiple sensing switches 143 arranged correspondingly below the outlets 1421. In the embodiment of the present disclosure, the number of guide roller shafts 141 is two, but other embodiments are not limited thereto.

Figure 3:
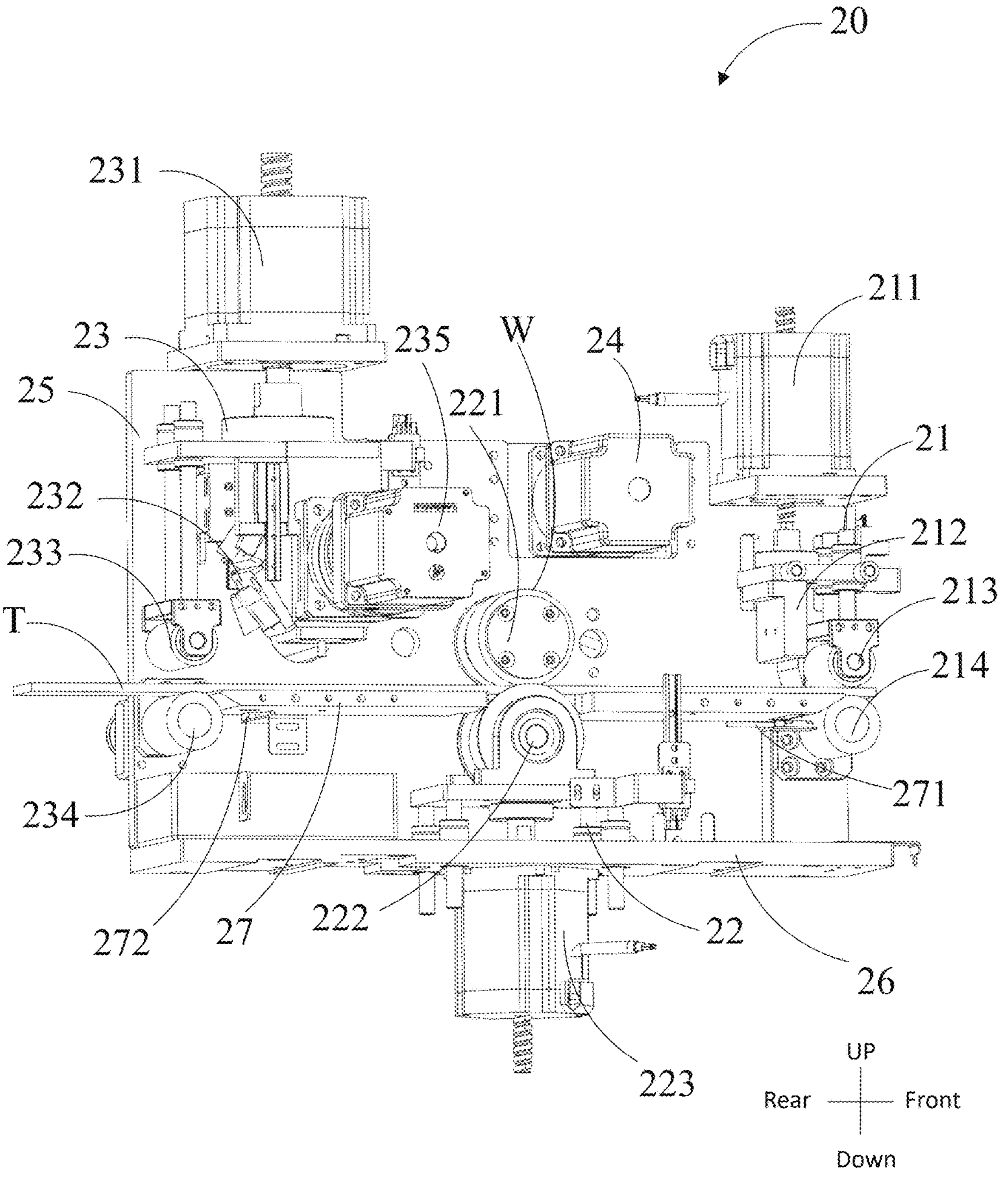
FIG. 3 is a schematic right side view of the belt manufacturing device of the belt vending machine of the present disclosure.
Figure 4:
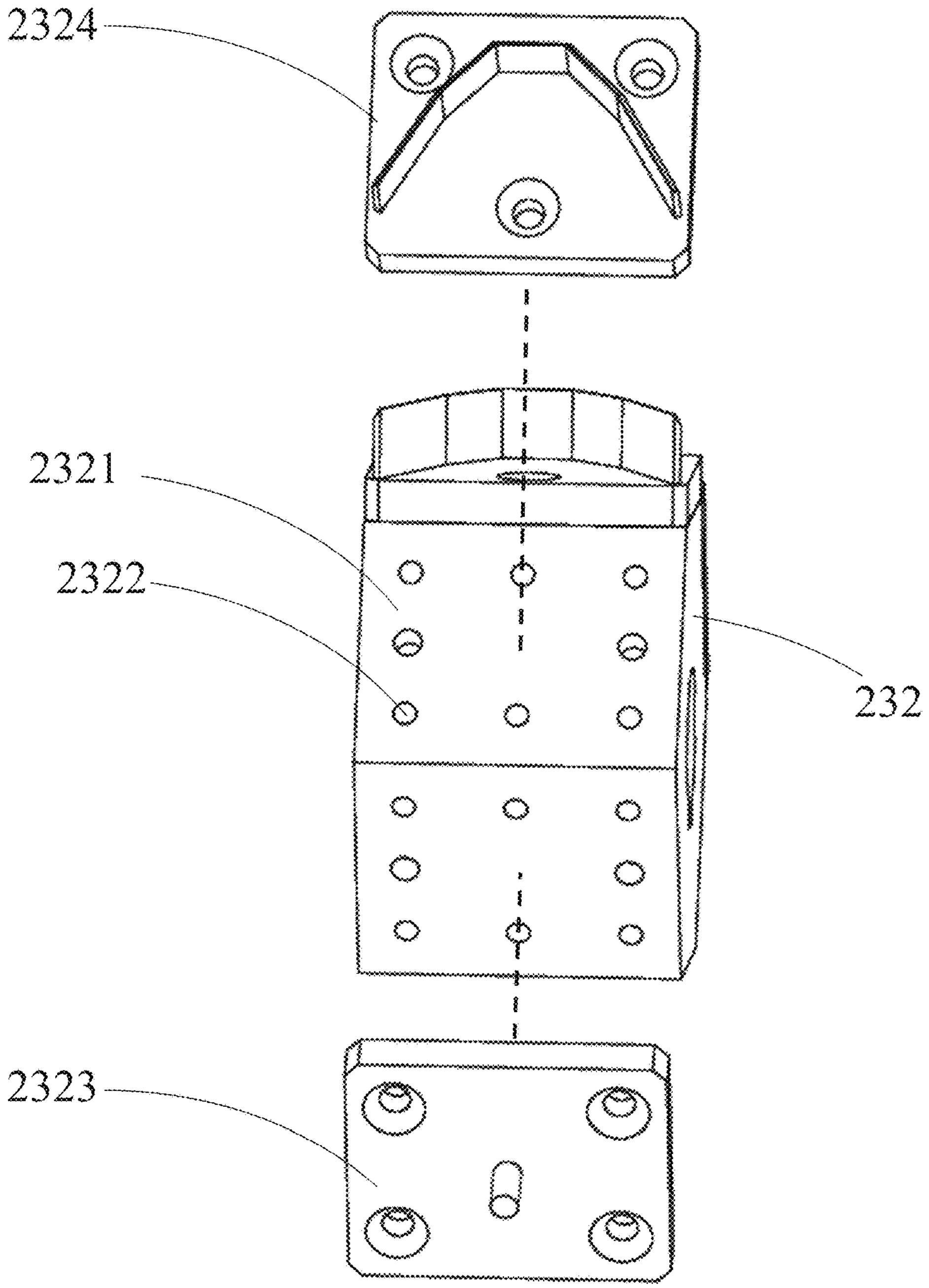
FIG. 4 is a schematic diagram of the punching and cutting wheel of the belt manufacturing device of the belt vending machine of the present disclosure.
Figure 5:
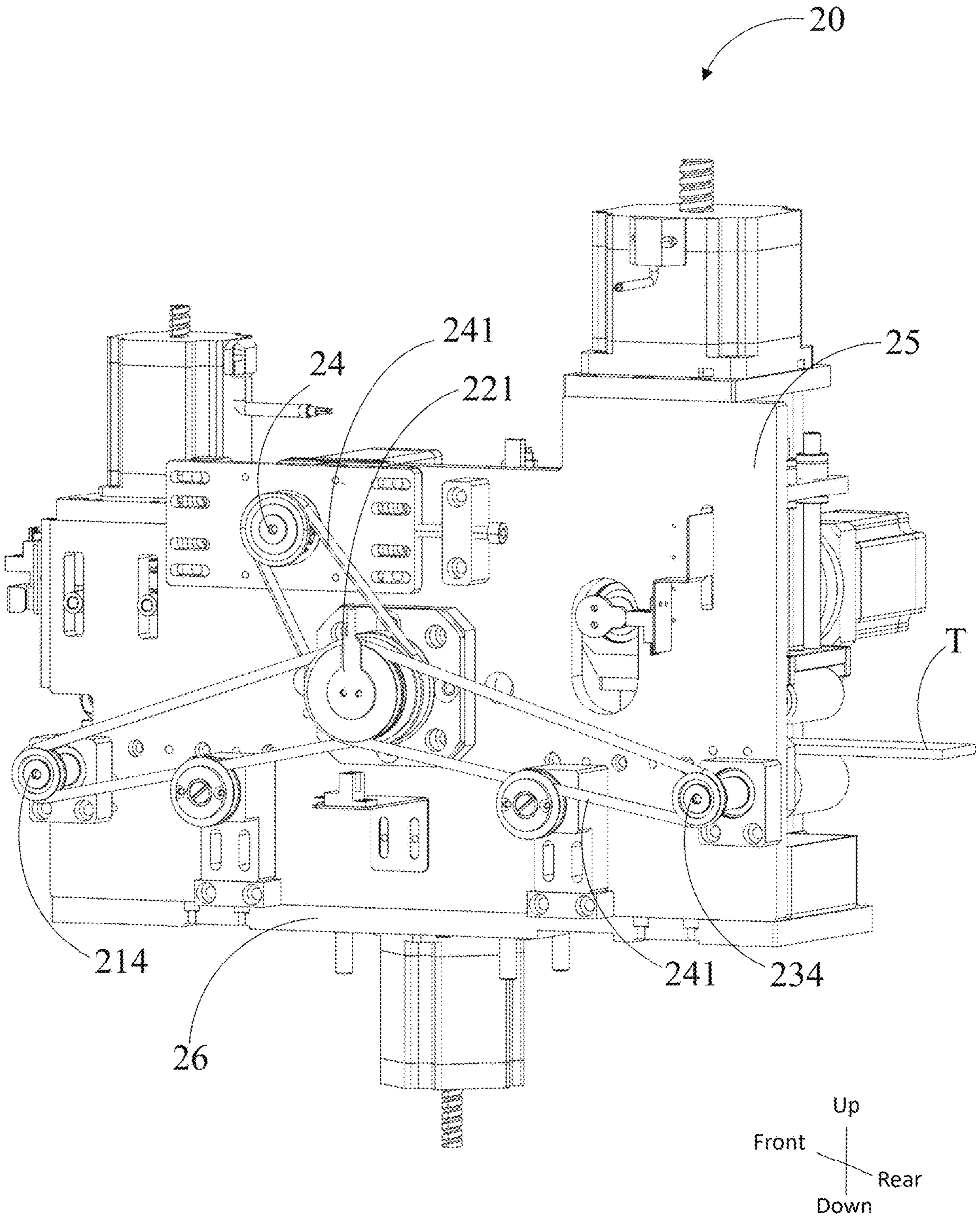
FIG. 5 is a schematic left side view of the belt manufacturing device of the belt vending machine of the present disclosure.

Reference is made to FIGS. 3 to 5. The belt manufacturing device 20 includes a mounting base plate 26 and a side plate 25. The mounting base plate 26 is vertically arranged along the Y-axis direction at the lower end of the side plate 25. A belt conveyor path 27 is installed vertically along the Y-axis direction on the right side of the side plate 25 and spaced apart from the mounting base plate 26. A cutting module 21, an embossing module 22, and a punching and cutting module 23 are sequentially arranged from front to rear on the right side of the side plate 25. A first sensor 271 and a second sensor 272 are installed on the bottom surface of the belt conveyor path 27, wherein the position of the first sensor 271 corresponds to the position of the cutting module 21, and the position of the second sensor 272 corresponds to the position of the punching and cutting module 23. The first sensor 271 and the second sensor 272 are used to detect the position of the belt T.

Furthermore, the mounting base plate 26 is mounted on a Y-axis moving module 40, and the mounting base plate 26 can move left and right along a track 42 of the Y-axis moving module 40, thereby allowing the belt manufacturing device 20 to move corresponding to the positions of the outlets 1421. When the belt manufacturing device 20 moves to a corresponding outlet 1421, the belt T will be moved onto the belt conveyor path 27 through the cutting module 21.

The cutting module 21 comprises, from top to bottom, a cutting motor 211, a cutting assembly 212, a front pressure roller 213, and a front drive roller 214. The front pressure roller 213 is located above the belt conveyor path 27, and the front drive roller 214 is located below the belt conveyor path 27. The cutting motor 211 is used to drive the rotation of the front pressure roller 213. The front pressure roller 213 presses the belt T downward onto the front drive roller 214 to clamp the belt T. When the front pressure roller 213 rotates, it causes the belt T to move toward the embossing module 22.

The embossing module 22 includes an embossing wheel shaft 221, a lifting motor 223, and a lifting roller 222. The embossing wheel shaft 221 is located above the belt conveyor path 27, and the lifting roller 222 is located below the belt conveyor path 27. The lifting motor 223 is connected below the lifting roller 222 to drive the rotation of the lifting roller 222. The lifting roller 222 lifts the belt T toward the embossing wheel shaft 221 to facilitate the embossing operation and allows the belt T to continue moving toward the punching and cutting module 23.

The punching and cutting module 23 comprises, from top to bottom, a punching and cutting motor 231, a punching and cutting wheel 232, a rear pressure roller 233, and a rear drive roller 234. The rear pressure roller 233 is located above the belt conveyor path 27, and the rear drive roller 234 is located below the belt conveyor path 27. The punching and cutting motor 231 is used to drive the rotation of the rear pressure roller 233. The rear pressure roller 233 presses the belt T downward onto the rear drive roller 234 to clamp the belt T. When the rear pressure roller 233 rotates, it allows the belt T to continue moving. The punching and cutting wheel 232 is connected to a switch motor 235, which is used to drive the rotation of the punching and cutting wheel 232.

Reference is made to FIG. 4. The punching and cutting wheel 232 has multiple rotating surfaces 2321, with each rotating surface 2321 having multiple mounting holes 2322 for mounting a punching plate 2323 or a cutting plate 2324. In other words, the punching and cutting wheel 232 can simultaneously have punching plates 2323 and cutting plates 2324 installed. The switch motor 235 rotates the punching and cutting wheel 232 so that it can perform punching or cutting operations.

Reference is made to FIG. 5. The belt manufacturing device 20 further comprises a drive motor 24, which is connected to the front drive roller 214, the embossing wheel shaft 221, and the rear drive roller 234 through a drive belt 241 on the left side of the side plate 25, so that the drive motor 24 can simultaneously drive the rotation of the front drive roller 214, the embossing wheel shaft 221, and the rear drive roller 234.

Figure 6:
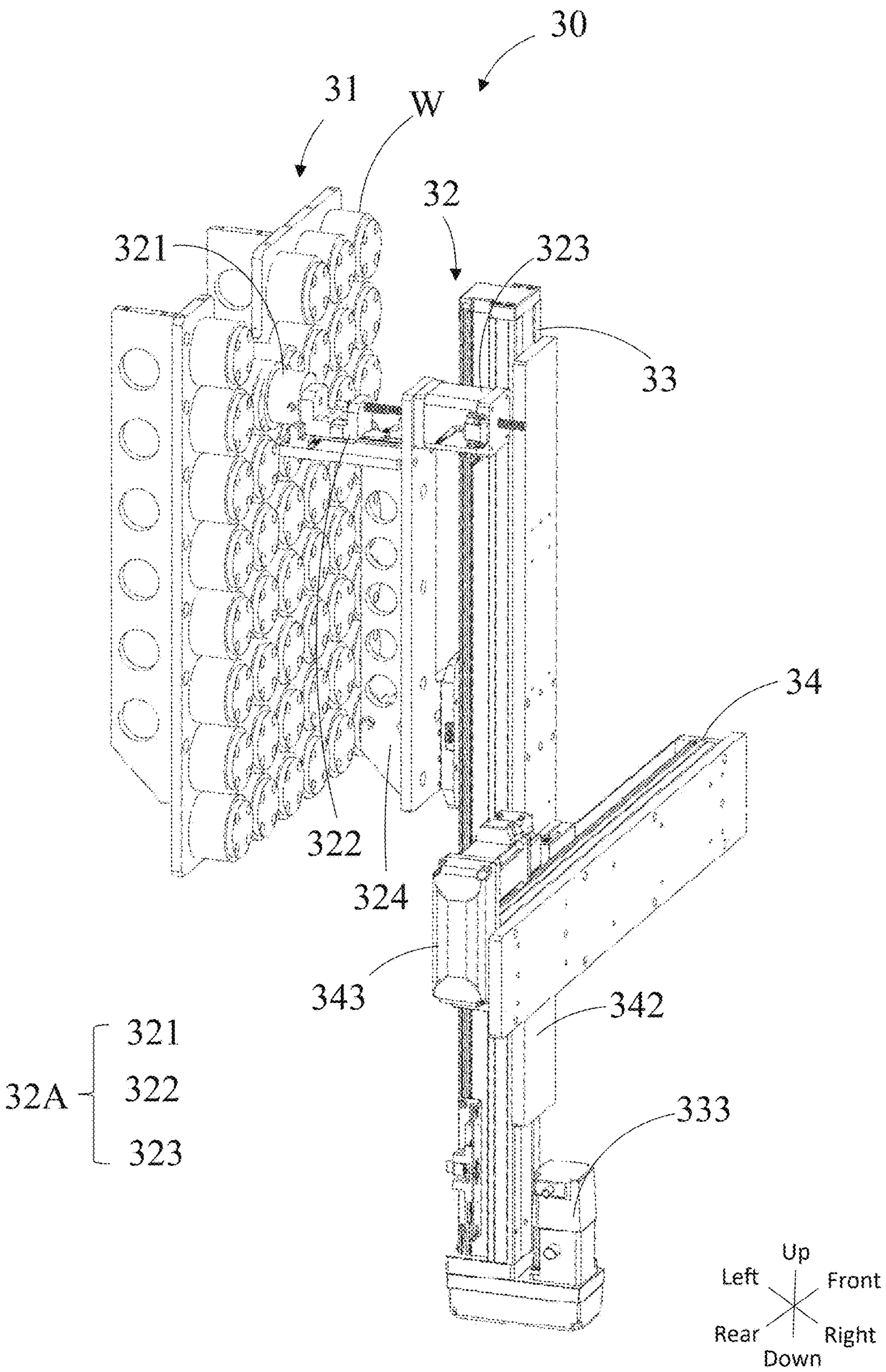
FIG. 6 is a schematic diagram of the embossing wheel pick-and-place device of the belt vending machine of the present disclosure.

Reference is made to FIG. 6. The embossing wheel pick-and-place device 30 is located below the belt manufacturing device 20. The embossing wheel pick-and-place device 30 includes a placement rack 31 and a pick-and-place module 32, wherein the retrieval module 32 is arranged at a distance on the right side of the placement rack 31, and multiple embossing wheels W are arranged in an array on the placement rack 31. The pick-and-place module 32 includes a Z-axis moving module 33 and an X-axis moving module 34. A pick-and-place assembly 32A is mounted on a support frame 324, which is mounted on the Z-axis moving module 33. The pick-and-place assembly 32A includes a retrieval head 321 connected to an extending structure 322, which is connected to a retrieval motor 323. The retrieval motor 323 can control the retrieval head 321 to approach or move away from the direction of the placement rack 31. In the embodiment of the present disclosure, the retrieval head 321 is an electromagnet that uses electromagnetic attraction to retrieve the embossing wheel W, thereby facilitating the movement of the embossing wheel W to the embossing module 22.

Furthermore, the Z-axis moving module 33 is mounted on the left side of the X-axis moving module 34 via a mounting plate 342, so that the X-axis moving module 34 has an X-axis moving motor 343 that drives the back-and-forth movement of the Z-axis moving module 33. The pick-and-place assembly 32A is mounted on the Z-axis moving module 33, which has a Z-axis moving motor 333 that drives the up-and-down movement of the pick-and-place assembly 32A on the Z-axis moving module 33. In the embodiment of the present disclosure, the embossing wheels W may have different embossing patterns. After the user selects a specified embossing pattern, the Z-axis moving module 33 and the X-axis moving module 34 can be used to move the pick-and-place assembly 32A to retrieve the corresponding embossing wheel W and move it to the embossing module 22.

Furthermore, the interior of the belt vending machine also comprises a waste bin 70 and a finished product bin 50. The waste bin 70 is used to store the belt waste cut during the belt manufacturing process. The finished product bin 50 has an inlet connected to the belt manufacturing device 20 and an outlet connected to a dispensing port 60 of the belt vending machine. After the belt manufacturing is completed, the finished product will be directly sent into the finished product bin 50, and the user can retrieve the finished belt through the dispensing port 60.

Reference is made to FIG. 7 for the belt manufacturing method of the aforementioned belt vending machine, which includes the following steps:

S1: after the user operates the belt vending machine to set the belt model, size, and embossing pattern, the embossing wheel pick-and-place device 30 moves to the corresponding embossing wheel W with the selected embossing pattern and moves the embossing wheel W onto the embossing wheel shaft 221 of the embossing module 22;

S2: the belt manufacturing device 20 moves to the outlet 1421 corresponding to one belt roll 122, and the cutting module 21 clamps one belt T from the belt roll 122 and causes the belt T to continue moving along the belt conveyor path 27 toward the embossing module 22;

S3: when the first sensor 271 detects the belt T, the drive motor 24 temporarily stops operating and the cutting module 21 cuts the leading end of the belt T (the leading end of the belt T being defined as the end that first contacts the belt conveyor path 27). After the cutting is completed, the drive motor 24 restarts and drives the belt T to continue moving toward the embossing module 22;

S4: when the belt T moves to the embossing module 22, the lifting roller 222 of the embossing module 22 lifts the belt T toward the direction of the embossing wheel shaft 221. At this time, the drive motor 24 continues to operate, and as the belt T continues to move toward the punching and cutting module 23, the embossing module 22 performs the embossing operation on the belt T;

S5: when the second sensor 272 detects the belt T, the punching and cutting module 23 clamps the belt T. At the same time, after the belt T has been transported a specified distance (depending on the size selected by the user), the drive motor 24 temporarily stops operating, and the punching and cutting wheel 232 rotates to have the punch hole face the belt T to perform a punching, and after the punching is completed, the drive motor 24 restarts;

S6: when the transport of the belt T of the user-specified length is completed, the drive motor 24 temporarily stops operating, and the cutting module 21 cuts the rear end of the belt T (the rear end of the belt T being defined as the end that last contacts the belt conveyor path 27). After cutting, the drive motor 24 is restarted, allowing the cut belt T to move toward the punching and cutting module 23;

S7: when the end of the cut belt T is conveyed to the punching and cutting module 23, the drive motor 24 temporarily stops operating, and the punching and cutting wheel 232 of the punching and cutting module 23 rotates to have the cutting surface face the rear end of the belt T to perform a second cut, thereby completing the manufacture of the belt T;

S8: after manufacturing is completed, the drive motor 24 restarts to convey the belt T to a finished product bin 50, and the cut belt waste is conveyed to a waste bin 70; and S9: the drive motor 24 stops operating, and the embossing wheel pick-and-place device 30 returns the embossing wheel W to its original position.

By incorporating the embossing wheel pick-and-place device 30 into the belt vending machine, the present disclosure provides various embossing patterns of the embossing wheels W for the user to choose from. Furthermore, this belt vending machine provides the multiple reels 12 for holding various styles or colors of the belt rolls 122. Through this, the belt vending machine can manufacture unique belts T according to the user's preferences.

What is claimed is:

1. A belt vending machine, the interior of which comprises:

a feeding device, the feeding device including multiple reels, each of the reels having a belt roll installed, with each of the belt rolls extending a belt from an outlet;

a belt manufacturing device, the belt manufacturing device being movable in accordance with the positions of the outlets, having a belt conveyor path, a side plate vertically arranged on the left side of the belt conveyor path, a cutting module, an embossing module, and a punching and cutting module arranged sequentially from front to rear on the side plate, wherein two sensors are installed on the bottom surface of the belt conveyor path, and the positions of the two sensors correspond to the positions of the cutting module and the punching and cutting module, respectively; and an embossing wheel pick-and-place device, the embossing wheel pick-and-place device being disposed below the belt manufacturing device and having a placement rack for holding multiple embossing wheels and a pick-and-place module for moving one of the embossing wheels to the embossing module.

2. The belt vending machine according to claim 1, wherein the cutting module comprises, from top to bottom, a cutting motor, a cutting assembly, a front pressure roller, and a front drive roller, wherein the front pressure roller is located above the belt conveyor path, the front drive roller is located below the belt conveyor path, and the cutting motor is used to drive the rotation of the front pressure roller.

3. The belt vending machine according to claim 2, wherein the punching and cutting module comprises, from top to bottom, a punching and cutting motor, a punching and cutting wheel, a rear pressure roller, and a rear drive roller, wherein the rear pressure roller is located above the belt conveyor path, the rear drive roller is located below the belt conveyor path, the punching and cutting motor is used to drive the rotation of the rear pressure roller, and the punching and cutting wheel is connected to a switch motor for driving the rotation of the punching and cutting wheel.

4. The belt vending machine according to claim 3, wherein the embossing module includes an embossing wheel shaft, a lifting motor, and a lifting roller, wherein the embossing wheel shaft is located above the belt conveyor path, the lifting roller is located below the belt conveyor path, and the lifting motor is connected below the lifting roller.

5. The belt vending machine according to claim 4, wherein the belt manufacturing device further comprises a drive motor for driving the rotation of the front drive roller, the embossing wheel shaft, and the rear drive roller.

6. The belt vending machine according to claim 3, wherein the punching and cutting wheel has multiple rotating surfaces, with each rotating surface having multiple mounting holes for mounting a punching plate or a cutting plate.

7. The belt vending machine according to in claim 1, wherein the belt manufacturing device further comprises a mounting base plate vertically arranged on the side plate, with the mounting base plate being mounted on a Y-axis moving module and movable along a track of the Y-axis moving module.

8. The belt vending machine according to claim 1, wherein the pick-and-place module includes a pick-and-place assembly, a Z-axis moving module, and an X-axis moving module, wherein the Z-axis moving module is mounted on the X-axis moving module, the X-axis moving module drives the back-and-forth movement of the Z-axis moving module, and the pick-and-place assembly is mounted on the Z-axis moving module which drives the up-and-down movement of the pick-and-place assembly.

9. The belt vending machine according to claim 8, wherein the pick-and-place assembly includes a retrieval head connected to an extending structure which is connected to a retrieval motor, with the retrieval motor controlling the retrieval head to approach or move away from the direction of the placement rack for retrieving one of the embossing wheels and moving the embossing wheel to the embossing module.

10. A belt manufacturing method for a belt vending machine, wherein the interior of the belt vending machine comprises a feeding device, a belt manufacturing device, an embossing wheel pick-and-place device, a waste bin, and a finished product bin, the belt manufacturing method comprising the steps of:

S1: the embossing wheel pick-and-place device moving an embossing wheel onto an embossing wheel shaft of an embossing module of the belt manufacturing device;

S2: a cutting module of the belt manufacturing device clamping a belt and causing the belt to move backward along a belt conveyor path;

S3: when a first sensor detects the belt, the cutting module cutting one end of the belt;

S4: when the belt moves to the embossing module, the embossing module performing an embossing on the belt;

S5: when a second sensor detects the belt, a punching and cutting module of the belt manufacturing device clamping the belt and performing punching on the belt;

S6: the cutting module cutting the other end of the belt;

S7: a punching and cutting wheel of the punching and cutting module rotating to a cut surface facing the other end of the belt and performing a second cut to complete the manufacture of the belt;

S8: the belt being conveyed to the finished product bin, and the cut belt waste being conveyed to the waste bin; and S9: the embossing wheel pick-and-place device returning the embossing wheel to its original position.

* * * * *